(No Model.)
J. TENNANT & J. HATTERSLEY.
METALLIC PACKING.
No. 306,293. Patented Oct. 7, 1884.
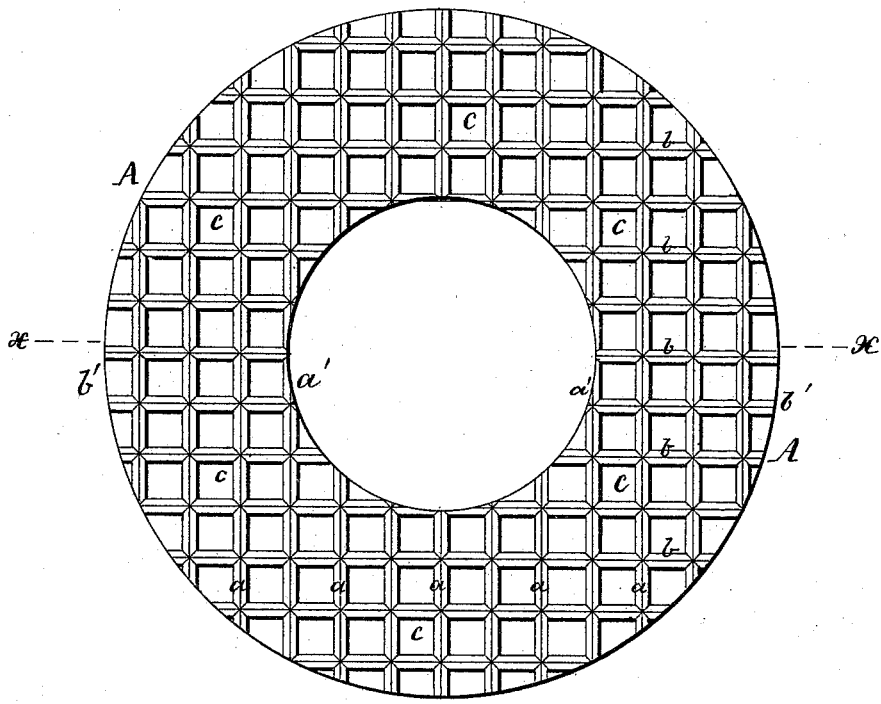
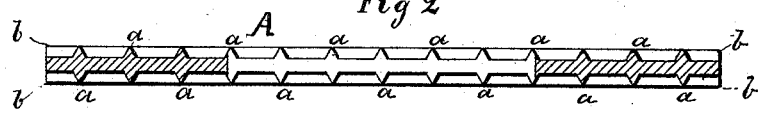
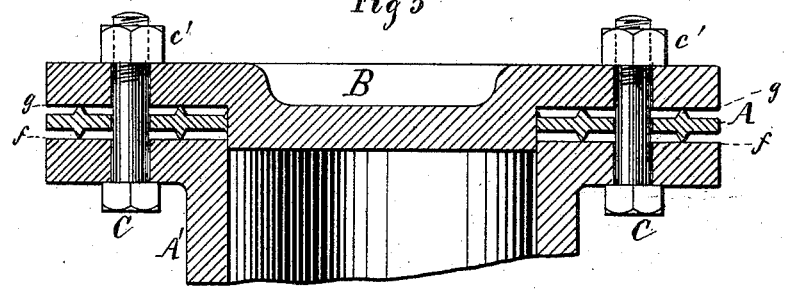
WITNESSES:
Rudolf A. Kjellman
Jas. F. MacShane
INVENTORS
John Tennant
John Hattersley
BY James A. Whitney
ATTORNEY

UNITED STATES PATENT OFFICE.

JOHN TENNANT AND JOHN HATTERSLEY, OF BROOKLYN, NEW YORK.

METALLIC PACKING.

SPECIFICATION forming part of Letters Patent No. 306,293, dated October 7, 1884.

Application filed October 11, 1883. (No model.)

*To all whom it may concern:*

Be it known that we, JOHN TENNANT and JOHN HATTERSLEY, both of the city of Brooklyn, in the county of Kings and State of New York, have invented an Improvement in Metallic Packing, of which the following is a specification.

This invention relates to that class of metallic packings in which an annular packing-ring of suitable soft metal is placed between two substantially coincident surfaces and then compressed, in order to provide a practically tight joint between them. Ordinarily in the use of such packings it is customary to turn or press down the surfaces to as nearly as possible coincident plane surfaces, inasmuch as it is difficult to otherwise insure suitable contact of the surfaces of the packing-ring with all parts of the surfaces to be packed.

The object of our invention is to provide a soft metallic packing which will not only be capable of use in connection with the accurately-finished surfaces aforesaid, but which may be used in connection with surfaces not thus finished or formed to substantially coincident plane, and insure in connection with such comparatively irregular surfaces a substantially perfect joint for all practical purposes, thereby in very many cases obviating the necessity of turning down or finishing the surfaces and obviating the expense of such turning or finishing of the surfaces.

Our invention comprises a packing-ring the surfaces of which are formed with intersecting ribs or ridges which provide cavities between them, so that when the packing is pressed in position between the two surfaces to be packed the compression of the said packing, acting upon the ribs or ridges, will, so to speak, flatten the same, the material of the ribs or ridges being forced interlaterally into the cavities, so that by this means the said ribs or ridges have their outer surfaces tightly compressed against the contiguous surfaces to be packed. The desired compression of the packing-ring requiring a very small degree of force as compared with a flat packing-ring, our said invention is further capable of successful use in other conditions where it is practically impossible to compress an ordinary flat packing-ring or a simple corrugated packing-ring to an extent sufficient to secure the tight joint.

Figure 1 is a face view of a packing-ring made according to our invention. Fig. 2 is a sectional view taken in the line $x\, x$ of Fig. 1. Fig. 3 is a sectional view corresponding to Fig. 2, so far as concerns the packing-ring itself, but also illustrating the arrangement with reference to the said packing-ring of the two surfaces to be packed.

The packing-ring A may be formed of any suitable soft metal or of any suitable soft alloy; but in practice we have found a composition composed of copper, antimony, spelter, and tin in the following proportions— namely, tin, one hundred pounds; antimony, nine and one-half pounds; copper, three and one-half pounds; spelter, four and one-half pounds, to be very effective for the purpose. We do not, however, confine ourselves to any particular material for the purpose. As to its general contour, the said packing-ring A may be turned flat, but its surfaces are not flat, each of said surfaces being formed with two series of ribs or ridges, $a\, b$, the ribs of the one series intersecting those of the other, as represented in Fig. 1, the preferred configuration in cross-section of the said ribs or ridges being more fully shown in Figs. 2 and 3.

Inasmuch as the series of ribs or ridges $a$ intersect the series of ribs or ridges $b$, it follows that there is formed between them depressions or cavities $c$.

When our improved packing is applied to use—as, for example, in packing a steam-joint between a cylinder, A′, and its head B, as represented in Fig. 3—the said ring is placed between the surfaces $f$ and $g$, between which the joint is to be formed, whereupon, by means of bolts C and nuts $c'\, c'$, or other suitable devices, the head B is tightened upon the cylinder A′, thereby compressing the ring between them.

Inasmuch as the cavity $c$ affords room for the ribs or ridges $a\, b$ to expand laterally when compressed from opposite sides of the packing-ring, it follows that the outer sides of the edges of the said ribs or ridges are fitted readily and snugly against the surfaces compressed thereon, and inasmuch as said ribs or ridges $a\, b$ constitute walls around each cavity $c$, it follows that fluid escaping in one of the said cavities is prevented from passing into another, and by this means the passage, whether of steam or other fluid, from the inner edge, $a'$, to the outer edge, $b'$, of the packing, is effectually prevented.

Owing to the readiness with which the bearing-surfaces of the packing are brought snugly in contact with the surfaces compressed thereon, the ring may be compressed to a degree sufficient to insure a tight joint under many circumstances in which a packing-ring having flat surfaces and thereby presenting greater resistance could not be so compressed, so that by means of our said invention we are enabled to have fluid-tight joints between surfaces which have not been turned or finished to substantially fit or correspond with each other. Furthermore, as the cavities $c$ are of small area, and each of said cavities is surrounded by ribs or ridges $a$ and $b$, it follows that no opportunity is afforded to the steam or other fluid to creep around from one part of the packing-ring to another, as frequently occurs with packing-rings formed simply with corrugations concentric with the center or axis of the packing.

It is of course to be understood that the circumferential contour of the packing-ring will correspond to that of the surfaces between which the joint is to be made, and that said packing-ring may not only be employed for packing the joints of cylinder-heads, &c., but under other conditions where it is desired to provide a steam or fluid tight joint between two contiguous surfaces.

Our said metallic packing may be manufactured by any suitable means—as, for example, by subjecting flat or suitably thick sheet soft metal to the action of dies suitably formed and operated.

We do not claim a gasket or packing of elastic material, such as rubber, gutta-percha, or like substance, provided with a series of concentric corrugations, as shown in the Letters Patent No. 126,624, dated May 14, 1872, as the same is wholly distinct and different from our herein-described invention.

We do not claim for the purposes of this present application the herein-described process or method of manufacturing our said invention, herein set forth and claimed, inasmuch as the said process or method forms the subject matter set forth in the specification and claims of our separate and distinct application for Letters Patent filed October 11, 1883, and indicated in the records of the Patent Office by Serial No. 108,117.

What we claim as our invention is—

A soft-metal packing having formed in one therewith ribs or ridges $a\, b$, intersecting each other and having depressions or cavities $c$ between, substantially as and for the purpose herein set forth.

JOHN TENNANT.
JOHN HATTERSLEY.

Witnesses:
    JOSIAH T. LOVEJOY,
    BENJ. F. DE VOE.